US012066049B2

(12) United States Patent
Goyer et al.

(10) Patent No.: US 12,066,049 B2
(45) Date of Patent: Aug. 20, 2024

(54) LOCKING NUT AND ASSOCIATED FASTENER

(71) Applicant: LISI AEROSPACE, Paris (FR)

(72) Inventors: Julien Goyer, Saint Gratien (FR); Batoubié Sotou-Bere, Pontoise (FR)

(73) Assignee: LISI AEROSPACE, Paris (FR)

( * ) Notice: Subject to any disclaimer, the term of this patent is extended or adjusted under 35 U.S.C. 154(b) by 385 days.

(21) Appl. No.: 17/520,605

(22) Filed: Nov. 5, 2021

(65) Prior Publication Data

US 2022/0154759 A1    May 19, 2022

(30) Foreign Application Priority Data

Nov. 19, 2020 (FR) ........................................ 2011880

(51) Int. Cl.
*F16B 39/30* (2006.01)

(52) U.S. Cl.
CPC .................................... *F16B 39/30* (2013.01)

(58) Field of Classification Search
CPC ...... F16B 39/101; F16B 39/20; F16B 39/284; F16B 23/0038; F16B 23/0092; F16B 41/002; F16B 39/04
USPC .................... 411/87, 277, 281, 282, 402, 410
See application file for complete search history.

(56) References Cited

U.S. PATENT DOCUMENTS

| | | | |
|---|---|---|---|
| 177,380 A * | 5/1876 | Curran | F16B 39/04 411/315 |
| 471,608 A * | 3/1892 | Gould | F16B 39/20 411/87 |
| 653,308 A * | 7/1900 | Morse | F16B 39/04 411/315 |
| 2,686,546 A | 8/1954 | MacLean, Jr. | |
| 2,754,871 A | 7/1956 | Stoll | |
| 2,890,734 A * | 6/1959 | Mullin | F16B 39/20 411/87 |
| 2,955,301 A | 10/1960 | Burt | |
| 3,140,636 A * | 7/1964 | Grimm | F16B 23/003 139/435.1 |

(Continued)

FOREIGN PATENT DOCUMENTS

| | | |
|---|---|---|
| CH | 425354 | 11/1966 |
| FR | 1183581 | 9/1957 |
| WO | WO 2010/085030 | 7/2010 |

OTHER PUBLICATIONS

Schandel, Yannick, Preliminary Search Report, Jul. 20, 2021, 2 pages, Republic of France National Institute of Industrial Property, Courbevoie, France.

*Primary Examiner* — Flemming Saether
(74) *Attorney, Agent, or Firm* — Henricks Slavin LLP

(57) ABSTRACT

The present invention relates to a locking nut (10), comprising: a body (20) and a bore passing through said body along a main axis, the body comprising: a bearing face (30); a drive surface (32); and at least one through-hole (38), substantially perpendicular to the main axis from the radial drive surface.
The body further comprises a locking collar (36) of elliptical shape; and the drive surface comprises an upper region (50) and a lower region (52), adjacent along the main axis, the lower region being situated between the upper region and the bearing surface; a perimeter of the lower region around the main axis being greater than a perimeter of the upper region; the at least one through-hole (38) extending from the upper region (50).

9 Claims, 4 Drawing Sheets

(56) References Cited

U.S. PATENT DOCUMENTS

| | | | |
|---|---|---|---|
| 3,275,054 A | | 9/1966 | Ohl |
| 3,674,075 A | | 7/1972 | Hoegee |
| 4,092,080 A | * | 5/1978 | Bradley, Jr. ............. F16B 39/10 |
| | | | 411/935 |
| 4,189,976 A | * | 2/1980 | Becker ................ F16B 23/0092 |
| | | | 411/410 |
| 4,889,458 A | * | 12/1989 | Taylor .................... F16B 39/02 |
| | | | 411/338 |
| 5,951,222 A | * | 9/1999 | Gosling ................ B23P 19/067 |
| | | | 411/87 |
| 6,150,656 A | * | 11/2000 | Garrity ................ F16B 39/101 |
| | | | 250/461.1 |
| 9,845,822 B2 | * | 12/2017 | Pailhories ............. F16B 39/284 |
| 10,465,740 B2 | * | 11/2019 | Freshour ................ B64C 25/34 |
| 2018/0135686 A1 | | 5/2018 | Freshour |

\* cited by examiner

[Fig 1]
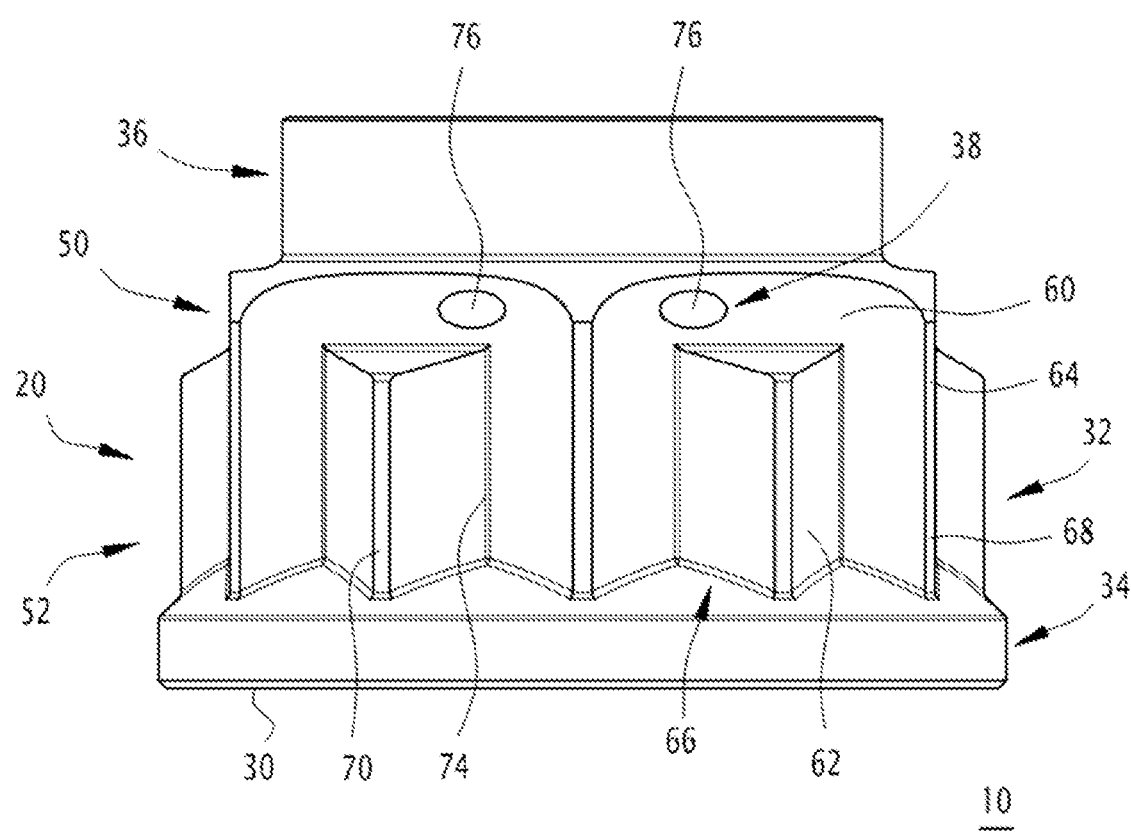

[Fig 2]
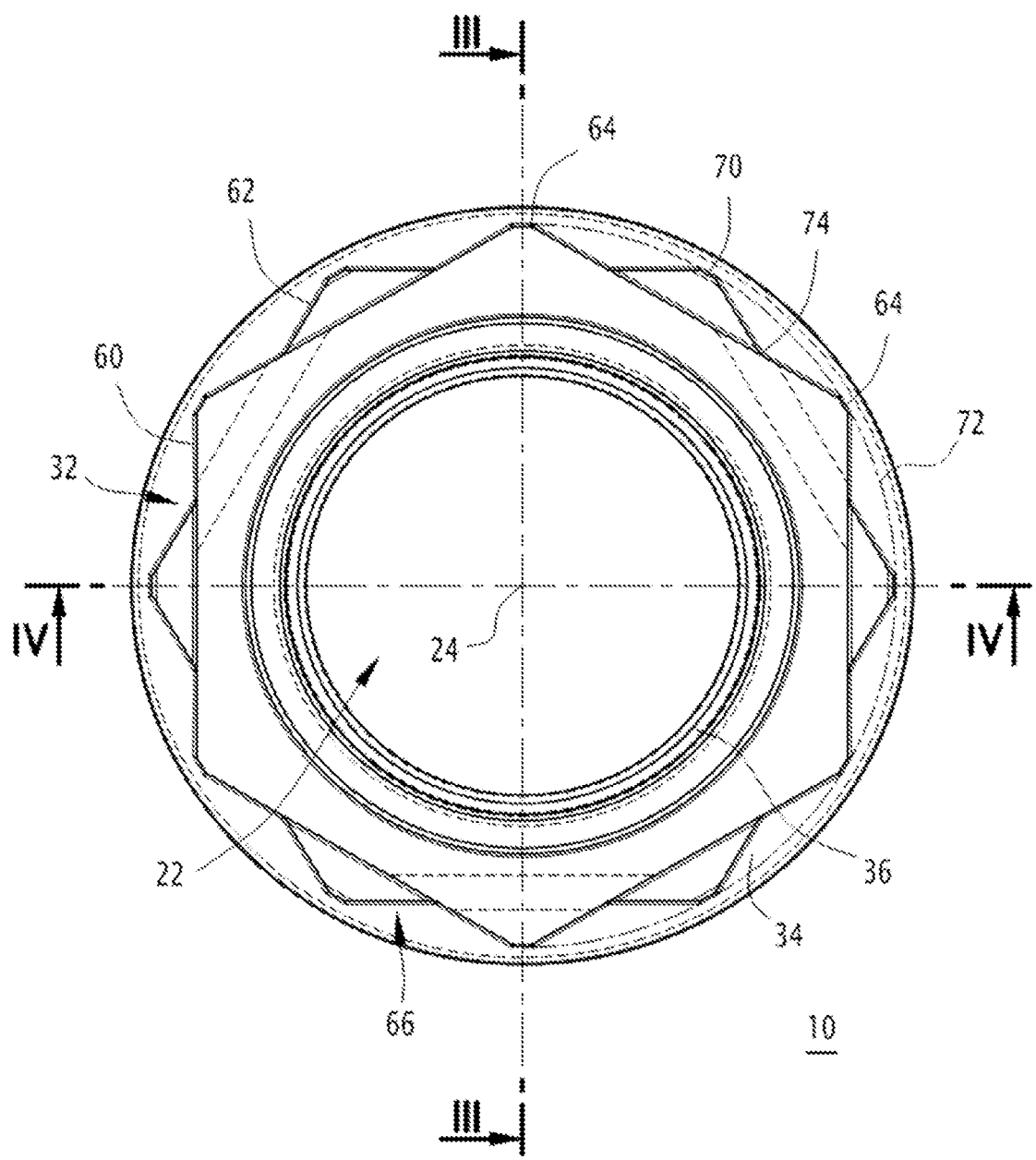

[Fig 3]
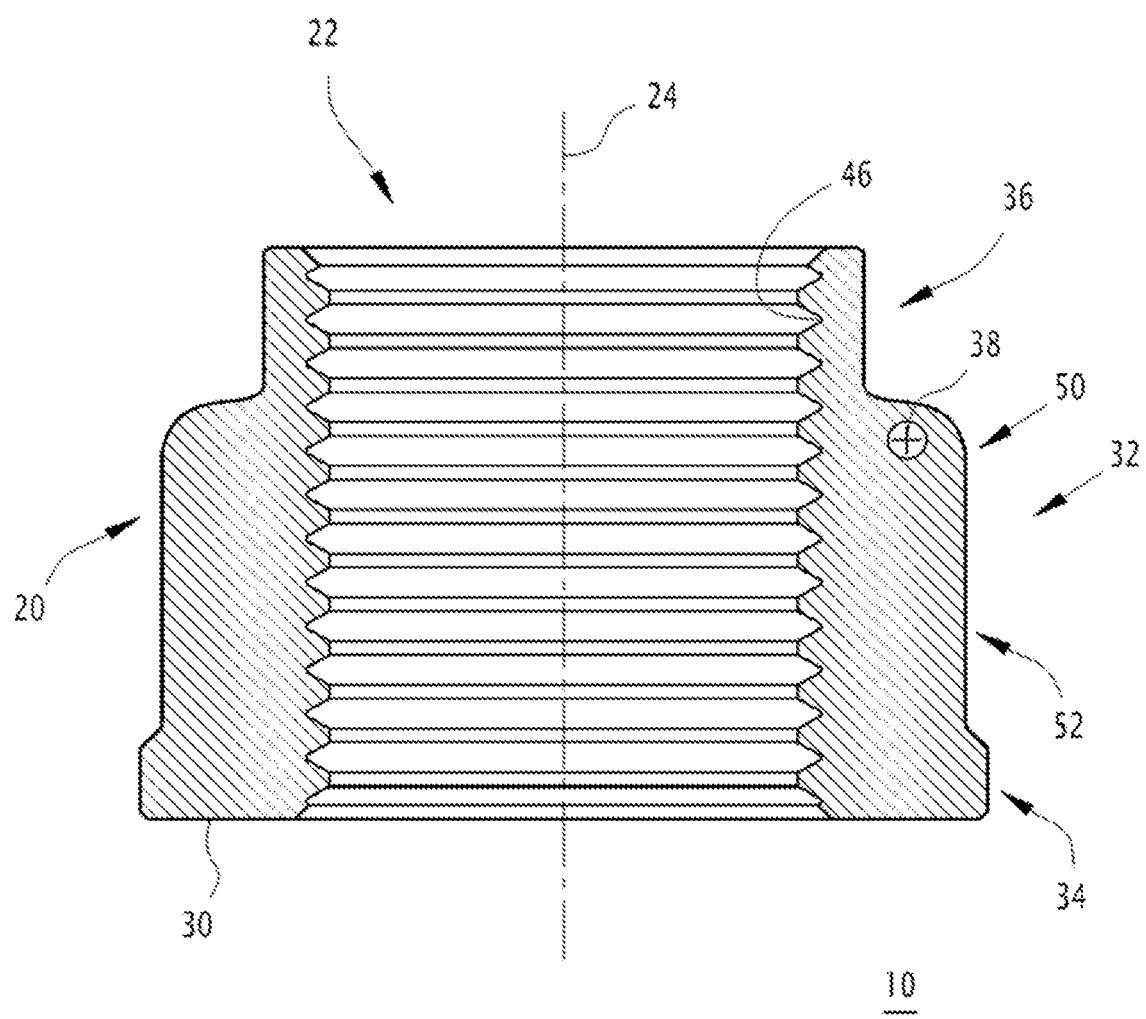

[Fig 4]
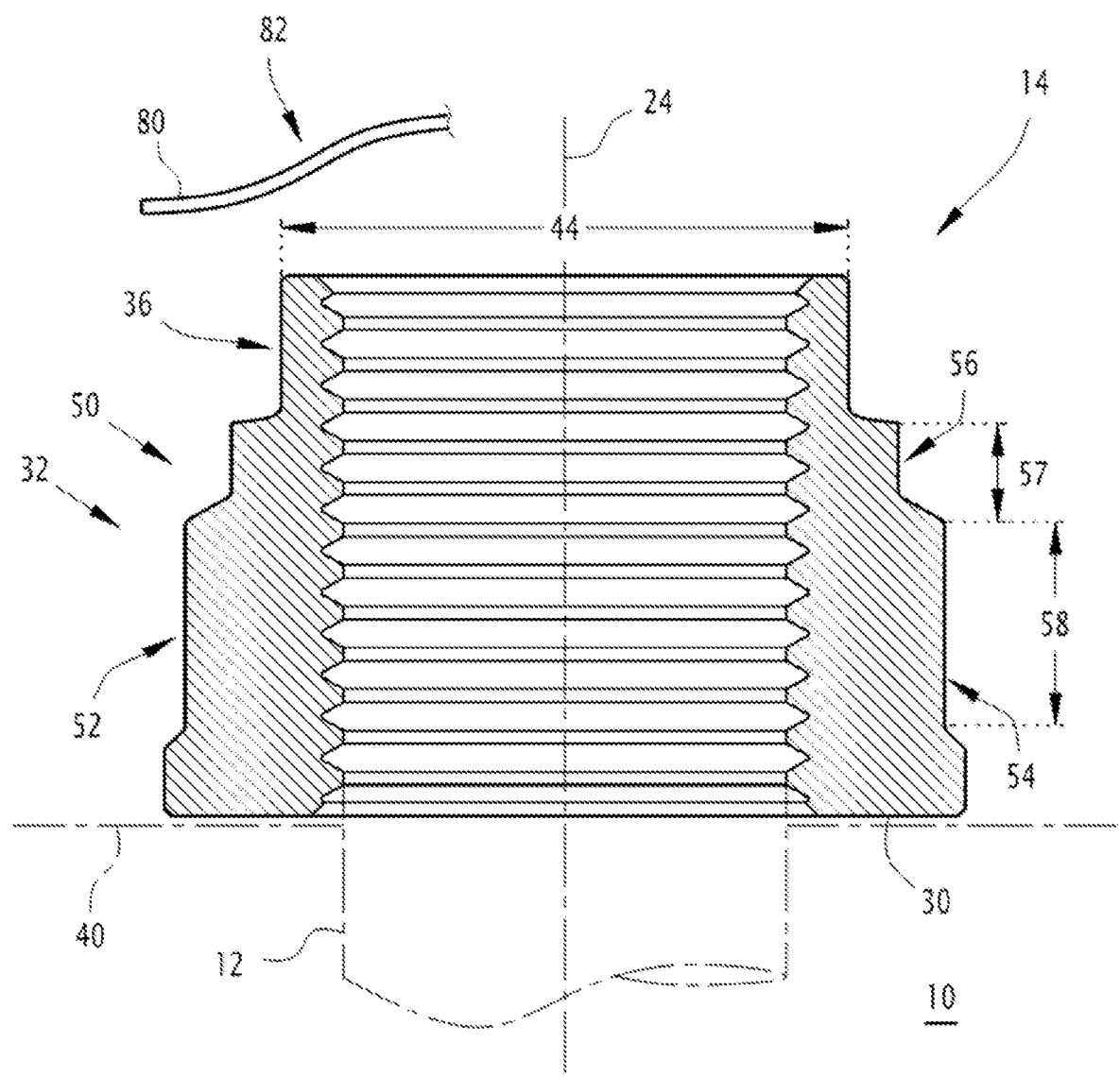

LOCKING NUT AND ASSOCIATED FASTENER

BACKGROUND

The present invention relates to a locking nut, of the type comprising a body and a bore passing through said body along a main axis, the body comprising: a bearing face substantially perpendicular to the main axis; a drive surface; and at least one through-hole, extending substantially perpendicular to the main axis from the radial drive surface.

The invention is particularly applicable to nuts used in aeronautical fasteners.

The purpose of locking a fastener of the screw/nut type is to prevent untimely unscrewing of the nut after installation of the fastener. Several locking methods are known. A first method called "lock wiring" consists in connecting several fasteners using a twist of metal wire, said wire passing through an orifice of each of the nuts, the orifice being made through two adjacent drive surfaces. The nuts are thus locked in rotation with respect to each other.

Another locking method consists in deforming the drive surfaces of the nut at two or three points in order to give the thread an elliptical shape, as in documents U.S. Pat. No. 2,686,546 or 2,754,871.

It is advantageous to configure the locking nuts so as to maintain sufficient locking torque after several cycles of installing/removing the fastener. To this end, it is known to provide the nuts with a cylindrical locking collar, of a smaller section than the body of the nut. The collar is locked at several points to give it an elliptical shape, as in document FR 1183581. This collar is more flexible than the body of the nut and deforms elastically a few times, unlike the body of the nut which is relatively more rigid.

However, such a solution involves giving the nut a greater height, or even reducing the height of the hexagonal part, that is to say of the drive surface of said nut. The tightening torque applicable to the nut may then be insufficient.

SUMMARY

The subject matter of the present invention is to overcome these problems. To this end, the invention relates to a locking nut of the aforementioned type, in which: the body further comprises a locking collar of elliptical shape, extending along the main axis away from the bearing surface relative to the drive surface; and the drive surface comprises an upper region and a lower region, adjacent along the main axis, the lower region being situated between the upper region and the bearing surface; a perimeter of the lower region around the main axis being greater than a perimeter of the upper region; the at least one through-hole extending from the upper region.

Among other beneficial aspects of the invention, the locking nut includes one or more of the following features, taken individually or in accordance with all technically possible combinations:
the drive surface comprises a series of first flats and a series of second flats, parallel to the main axis; the first flats extending over the upper and lower regions, the second flats extending only over the lower region;
the lower region comprises first and second intersections between the adjacent flats, each first intersection forming a convex surface and each second intersection forming a concave surface;
the at least one through-hole extends into the upper region between two first adjacent flats;
the nut further comprises an enlarged base, arranged between the bearing surface and the lower region of the drive surface.

The invention further relates to a fastener comprising: a nut as described above; and a threaded rod, suitable for assembly with an internal thread of the bore of the nut.

The invention further relates to an assembly comprising: a fastener as described above; and a metal wire, suitable for being passed through the at least one through-hole of the nut.

BRIEF DESCRIPTION OF THE DRAWINGS

The invention will be better understood upon reading the following description, which is provided solely by way of a non-limiting example, and with reference to the drawings, in which:

FIG. 1 is a front view of a nut according to an embodiment of the invention;

FIG. 2 is a top view of the nut of FIG. 1;

FIG. 3 is a sectional view of the nut of FIGS. 1 and 2; and

FIG. 4 is a partial sectional view of an assembly comprising the nut of FIGS. 1 to 3.

DETAILED DESCRIPTION

FIGS. 1 to 4 represent a nut 10 according to an embodiment of the invention. Said nut is intended to be assembled to a threaded rod 12, visible in FIG. 4, to form a fastener 14.

The nut 10 comprises a body 20 and a bore 22 passing through said body along a main axis 24.

The body 20 of the nut comprises: a bearing face 30; a drive surface 32; a base 34; a locking collar 36; and a through-hole 38.

The bearing face 30 is intended to bear upon a surface of a structure 40 (FIG. 4) assembled to the fastener 14. The bearing face 30 is substantially flat and perpendicular to the main axis 24.

The drive surface 32, or wrenching section, extends around the main axis 24 and is intended for screwing/unscrewing the nut by means of a tool. The drive surface 32 will be described in more detail below.

The optional base 34 is arranged between the drive surface 32 and the bearing face 30. The base has a substantially frustoconical shape which flares out from the drive surface 32.

The locking collar 36 extends the drive surface 32 relative to the main axis 24, away from the base 34 or from the bearing face 30. An outer diameter 44 of the locking collar 36 is less than or equal to, preferably substantially equal to, a minimum radial dimension of the drive surface 32. The locking collar is of a slightly elliptical shape.

The through-hole 38 extends substantially perpendicular to the main axis 24 from the drive surface 32. The through-hole 38 will be described in more detail below.

The bore 22 is defined by an internal wall 46 of body 20. Said internal wall is substantially rotationally cylindrical and provided with an internal thread, suitable for co-operating with the thread of the rod 12.

The drive surface 32 will now be described. The drive surface 32 comprises an upper region 50 and a lower region 52, adjacent along the main axis 24. The lower region 52 is located between the upper region 50 and the base 34, or the bearing face 30 if the base is omitted.

A perimeter 54 of the lower region 52 around the main axis 24 is larger than a perimeter 56 of the upper region 50. The perimeter 54, 56 is represented on a section of the nut 10 perpendicular to the main axis 24.

The upper region 50 and the lower region 52 respectively have a height 57 and a height 58 along the main axis 24.

As will be described below, the through-hole 38 is located in the upper region 50. As will be described below, the height 57 of the upper region 50 is in particular chosen to allow the arrangement of said through-hole.

In the embodiment shown, the drive surface 32 comprises a series of first sides or flats 60 and a series of second sides or flats 62. The first 60 and second 62 flats are parallel to the main axis 24.

More precisely, the drive surface 32 comprises six first flats 60 of identical dimensions, distributed angularly in a regular manner around the main axis 24. The drive surface 32 further comprises six first edges 64, separating the first flats 60 in pairs. In a known manner, the first two flats 60 on either side of a first edge 64 define a convex surface.

The first flats 60 and the first edges 64 extend over both the upper region 50 and the lower region 52 of the drive surface 32.

In addition, the drive surface has twelve second flats 62 of identical dimensions. The second flats 62 form six pairs 66 distributed angularly in a regular manner around the main axis 24. More precisely, each pair 66 of second flats 62 is arranged substantially in the middle of a first flat 60, at an equal distance from the first edges 64 delimiting said first flat. Each pair 66 of second flats 62 forms a radial projection in relation to the corresponding first flat 60.

The second flats 62 extend only over the lower region 52 of the drive surface 32 and have a height less than the height of the first flats.

The drive surface 32 further includes six second edges 70. Each second edge 70 separates two second flats 62 of a same pair 66, defining a convex surface.

The first edge 64 and second edge 70 are tangent to the same envelope cylinder 72 with a circular base, centered on the main axis 24.

The drive surface 32 further comprises twelve third edges 74. Each third edge 74 separates a first 60 and a second 62 adjacent flat, defining a concave surface.

The second edge 70 and third edge 74 extend only into the lower area 52 of the drive surface 32.

In other words, the upper region 50 of the driving surface 32 is a hexagonal surface, while the lower region 52 of said drive surface is a bi-hexagonal surface.

In the embodiment shown, the through-hole 38 extends between two first adjacent flats 60. More precisely, the through-hole 38 extends between two ends 76, each end opening onto one of said first adjacent flats 60.

Thus, the through-hole 38 is arranged separate to the bore 22 and does not open onto said bore.

The through-hole 38 is substantially straight between the two ends 76 and extends along a plane perpendicular to the main axis 24.

Such a configuration is made possible by the hexagonal surface formed by the upper region 50. Indeed, the bi-hexagonal surface of the lower region 52 does not allow the arrangement of the ends 76 of the through-hole 38.

The height 57 of the upper region 50 is chosen to allow the arrangement of the through-hole 38. For example, for a 1,100 MPa stainless steel nut having a $^{10}/_{16}$ inch diameter thread, a distance across two opposite flats of 18.82 mm, the height 57 is 2.2 mm. Such a height 57 allows the boring of an orifice 38 with a diameter of 1.2 mm, and a height 58 of 5.4 mm for the lower region 52. Such a nut makes it possible to apply a torque of 320 N·m.

Preferably, the body 20 comprises several through-holes 38 which are substantially identical and distributed angularly around the main axis 24. In the embodiment shown, the body 20 comprises three identical through-holes 38, substantially arranged at the vertices of an equilateral triangle centered on the main axis 24.

As used herein, "substantially" shall mean the designated parameter or configuration, plus or minus 10%.

A method of using the nut 10 and the threaded rod 12 will now be described. The threaded rod 12 is inserted into a bore of the structure 40 and the nut 10 is screwed onto one end of said rod, by means of a suitable tool (not shown) co-operating with the drive surface 32.

In particular, the surface of the lower region 52 corresponds to a larger contact surface with the tool, so as to transmit a significant tightening torque.

In the embodiment shown, the bi-hexagonal surface of the lower region 52 cooperates with a tool (not shown) of a shape complementary to said surface. The tool also co-operates with the first flats 60 at the upper region 50, near the first edges 64, which contributes to increasing the tightening torque.

The fastener 14 being thus installed, the lock wiring is for example carried out as follows: a first end 80 of a metal wire 82 (FIG. 4) is inserted into the or one of the through-holes 38. The metal wire 82 can be wound around an attachment point on the surface of the structure 40, such as another fastener 14 (not shown). A second end of the wire 82 can then be twisted with the first end 80 or attached to another point of attachment.

The nut 10 is thus locked in rotation by the metal wire 82 relative to the surface of the structure 40.

Thus, the nut 10 offers an optimized tightening torque, efficient locking allowing several assembly/disassembly cycles, while minimizing the height of the nut and allowing the arrangement of an orifice 38 for the locking wire 82 on the drive surface 32 of said nut.

The invention claimed is:

1. A locking nut, comprising a body and a bore passing through said body along a main axis, the body comprising: a bearing face substantially perpendicular to the main axis; a drive surface; and at least one through-hole extending substantially perpendicular to the main axis from the drive surface;

said nut being characterized in that:

the body further comprises a locking collar of elliptical shape, extending along the main axis away from the bearing surface relative to the drive surface; and the drive surface comprises an upper region and a lower region, adjacent along the main axis, the lower region being situated between the upper region and the bearing surface; a perimeter of the lower region in a plane perpendicular to the main axis being larger than a perimeter of the upper region in a plane perpendicular to the main axis;

the at least one through-hole extending through a portion of the upper region.

2. A nut according to claim 1, wherein the drive surface has a series of first flats and a series of second flats, parallel to the main axis; the first flats extending over the upper and lower regions, the second flats extending only over the lower region.

3. A nut according to claim 2, wherein the lower region comprises first and second intersections between adjacent flats, each first intersection forming a convex surface and each second intersection forming a concave surface.

4. A nut according to claim 2, wherein the at least one through-hole extends into the upper region between two adjacent first flats.

5. A nut according to claim 2, wherein the drive surface upper region defines an upper region height and the drive surface lower region defines a lower region height that is greater than the upper region height.

6. A nut according to claim 5, wherein the drive surface upper region includes six flats and the drive surface lower region includes twelve flats.

7. A nut according to claim 1, further comprising a base arranged between the bearing surface and the lower region of the drive surface.

8. A fastener comprising: a nut according to claim 1; and a threaded rod, suitable for being assembled with an internal thread of the bore of the nut.

9. An assembly comprising: a fastener according to claim 8;

and a metal wire, able to be passed through the at least one through-hole of the nut.

* * * * *